US009843950B2

(12) United States Patent
Yi et al.

(10) Patent No.: US 9,843,950 B2
(45) Date of Patent: Dec. 12, 2017

(54) METHOD AND APPARATUS FOR PERFORMING DATA TRANSMISSION IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

(21) Appl. No.: 14/771,098

(22) PCT Filed: Mar. 14, 2014

(86) PCT No.: PCT/KR2014/002184
§ 371 (c)(1),
(2) Date: Aug. 27, 2015

(87) PCT Pub. No.: WO2014/142611
PCT Pub. Date: Sep. 18, 2014

(65) Prior Publication Data
US 2016/0014626 A1 Jan. 14, 2016

Related U.S. Application Data

(60) Provisional application No. 61/785,785, filed on Mar. 14, 2013.

(51) Int. Cl.
*H04W 24/08* (2009.01)
*H04J 11/00* (2006.01)
(Continued)

(52) U.S. Cl.
CPC ......... *H04W 24/08* (2013.01); *H04J 11/0053* (2013.01); *H04L 5/001* (2013.01);
(Continued)

(58) Field of Classification Search
CPC .... H04W 24/00; H04L 43/50; H04L 43/0852; H04L 43/08; H04B 17/003
See application file for complete search history.

(56) References Cited

U.S. PATENT DOCUMENTS

2009/0196294 A1* 8/2009 Black .................... H04L 1/1607
370/394
2011/0141996 A1* 6/2011 Yamada ............ H04W 72/0453
370/329

(Continued)

OTHER PUBLICATIONS

3GPP TSG RAN WG2 Meeting #81, Jan. 28, 2013-Feb. 1, 2013, R2-130570.*

(Continued)

*Primary Examiner* — Hassan Phillips
*Assistant Examiner* — Siren Wei
(74) *Attorney, Agent, or Firm* — Birch, Stewart, Kolasch & Birch, LLP

(57) ABSTRACT

A method for and apparatus for performing data transmission in a wireless communication system is provided. A wireless device performs a radio resource control (RRC) connection procedure with a macro cell having a first frequency, performs a radio resource management (RRM) measurement on a small cell having a second frequency or a third frequency, and reporting a result of the RRM measurement to the macro cell; and receives data via the second frequency or the third frequency of the TP, the data is consecutive data relayed from an initial transmission of the macro cell, wherein the macro cell and the small cell are connected with a fast backhaul by using air interface.

14 Claims, 10 Drawing Sheets

(51) Int. Cl.
*H04L 5/00* (2006.01)
*H04W 72/04* (2009.01)
*H04W 76/02* (2009.01)
*H04W 24/10* (2009.01)
*H04W 84/04* (2009.01)

(52) U.S. Cl.
CPC ......... *H04L 5/0053* (2013.01); *H04W 72/042* (2013.01); *H04W 76/02* (2013.01); *H04W 24/10* (2013.01); *H04W 84/045* (2013.01)

(56) References Cited

U.S. PATENT DOCUMENTS

| | | | | |
|---|---|---|---|---|
| 2011/0223923 | A1* | 9/2011 | Cho | H04W 72/082 455/448 |
| 2012/0015659 | A1* | 1/2012 | Kalyani | H04W 72/085 455/436 |
| 2012/0163357 | A1* | 6/2012 | Won | H04L 1/1671 370/338 |
| 2012/0178454 | A1* | 7/2012 | Kim | H04W 72/0426 455/436 |
| 2013/0301543 | A1* | 11/2013 | Eriksson | H04W 72/00 370/329 |
| 2014/0204771 | A1* | 7/2014 | Gao | H04W 36/28 370/252 |

OTHER PUBLICATIONS

Intel Corporation, "Scenarios and benefits of dual connectivity", R2-130570, 3GPP TSG RAN WG2 Meeting #81, St. Julian's, Malta, Jan. 28-Feb. 1, 2013.

KDDI, "Views on Efficient Small Cell Operations", R1-130208, 3GPP TSG RAN WG1 Meeting #72, St Julian's, Malta, Jan. 28-Feb. 1, 2013.

NEC Group, "Small cell operation under macro overage", R1-130373, 3GPP TSG RAN WG1 Meeting #72, St Julian's, Malta, Jan. 28-Feb. 1, 2013.

NTT Docomo, "Scenario and Candidate Technologies for Small Cell Enhancement", R1-130743, 3GPP TSG RAN WG1 Meeting #72, St Julian's, Malta, Jan. 28-Feb. 1, 2013.

* cited by examiner

[Fig. 1]
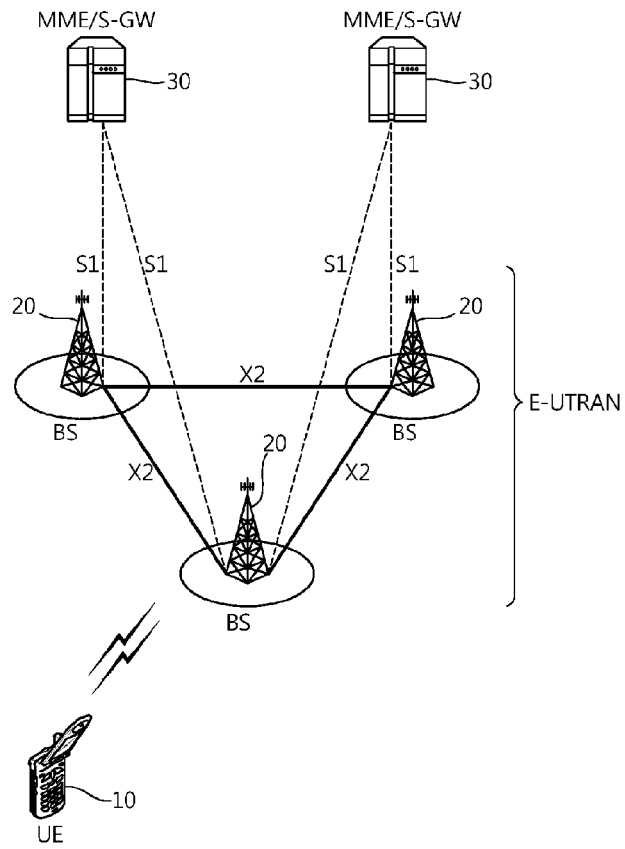
[Fig. 2]
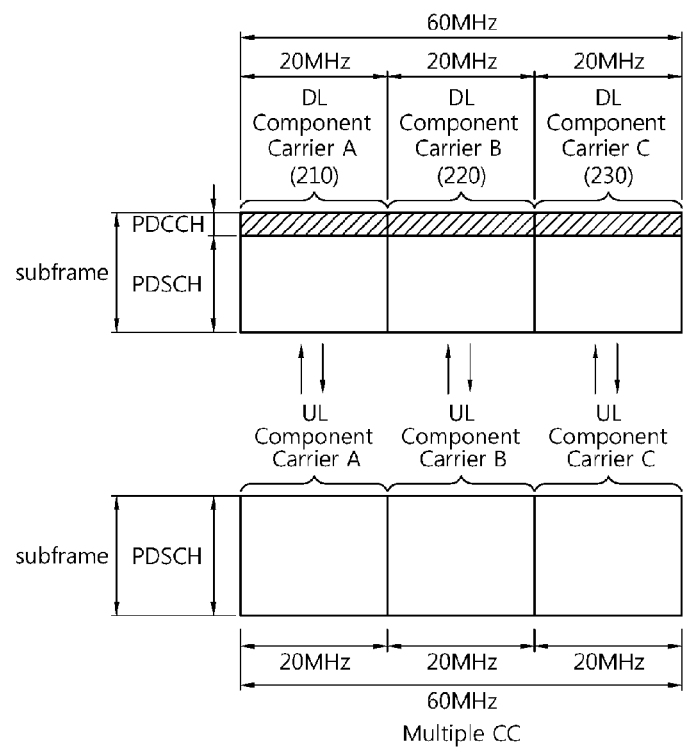

[Fig. 3]
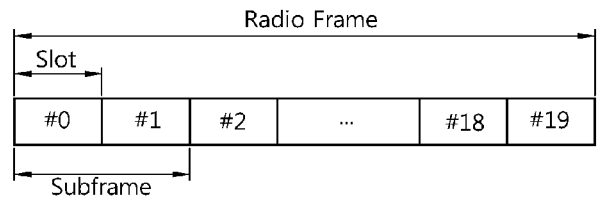
[Fig. 4]
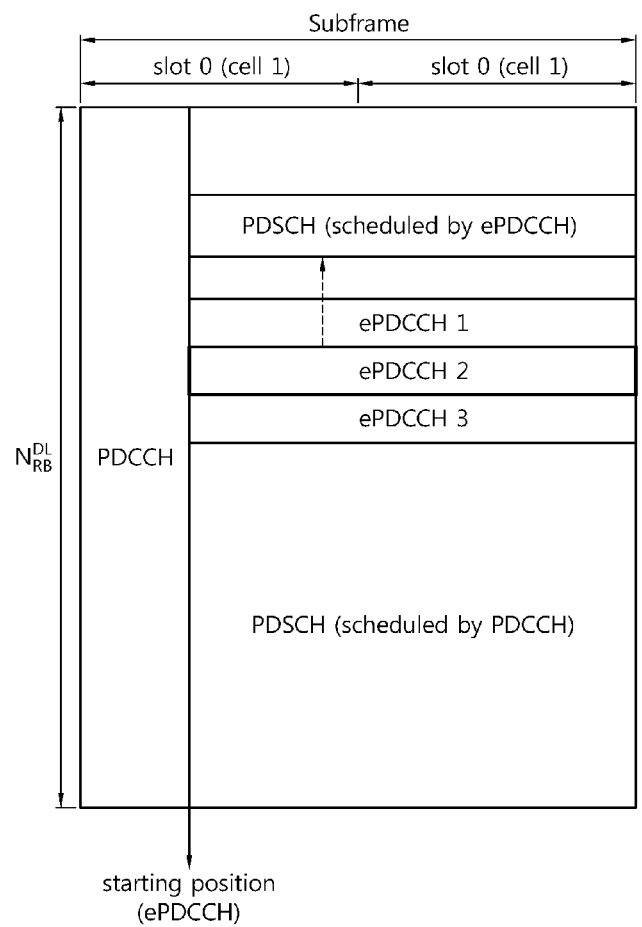

[Fig. 5]
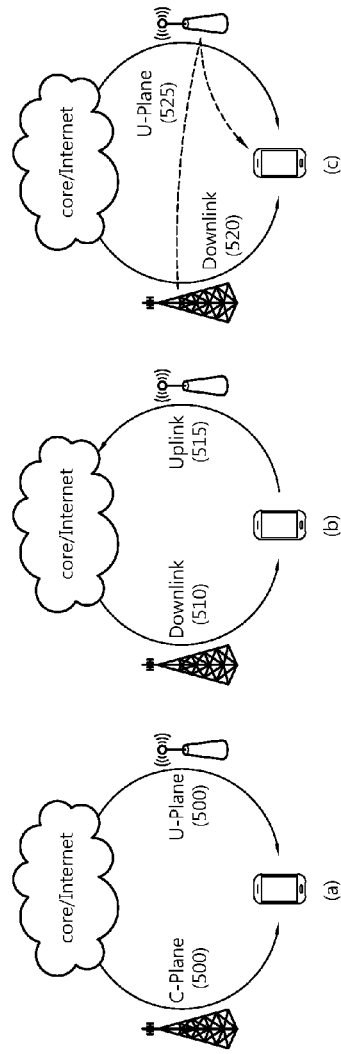

[Fig. 6]
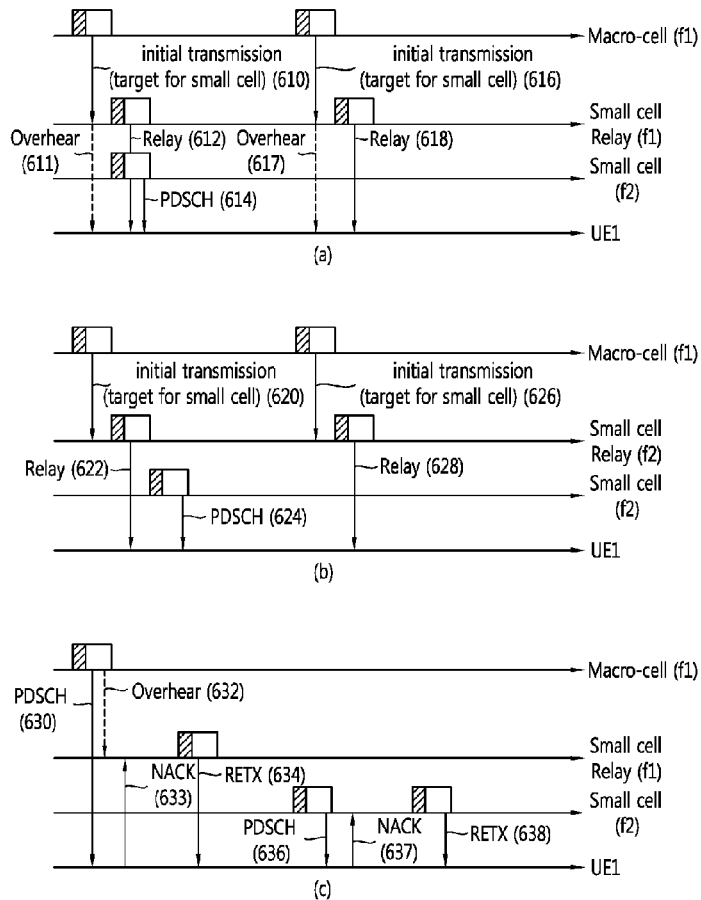
[Fig. 7]
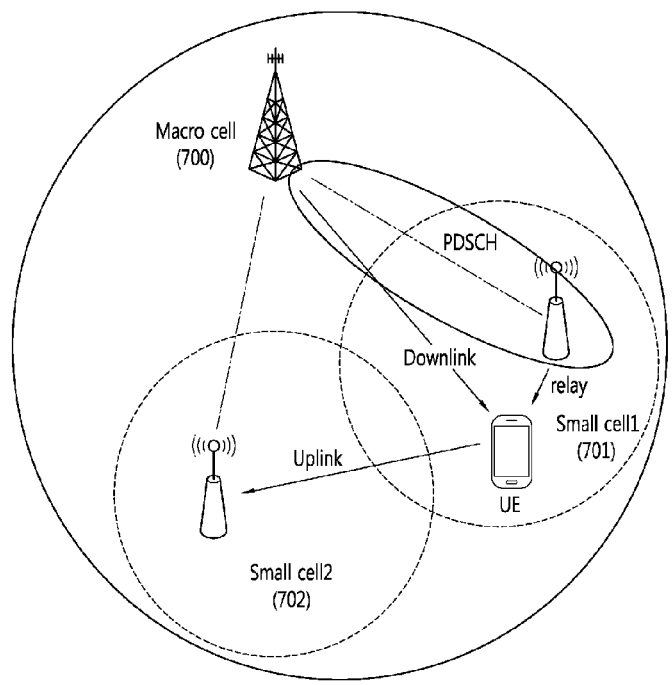

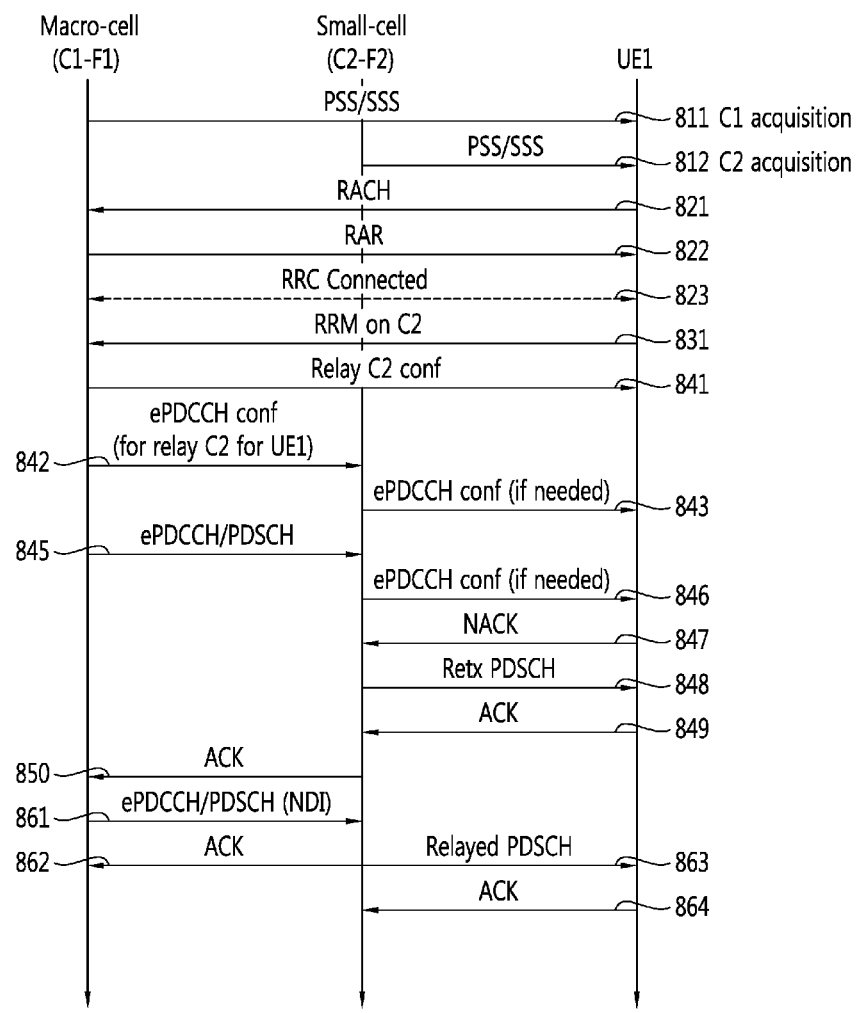

[Fig. 9]
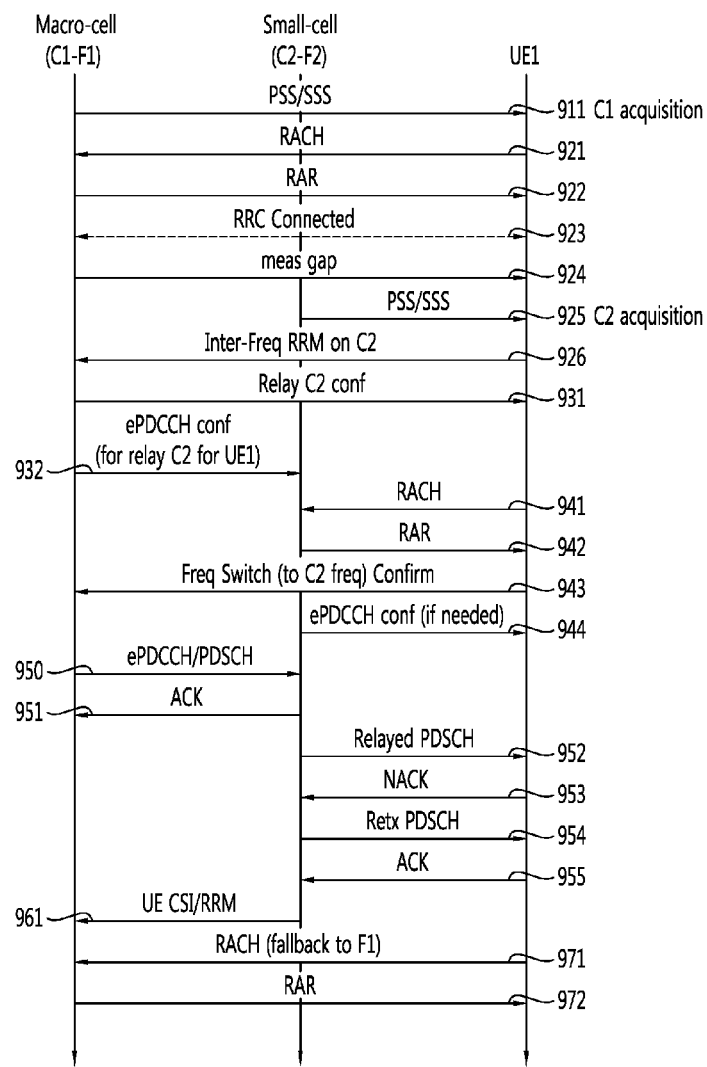

[Fig. 10]
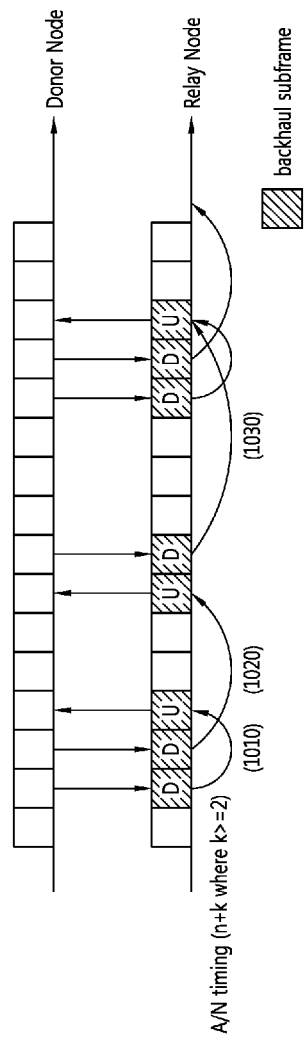

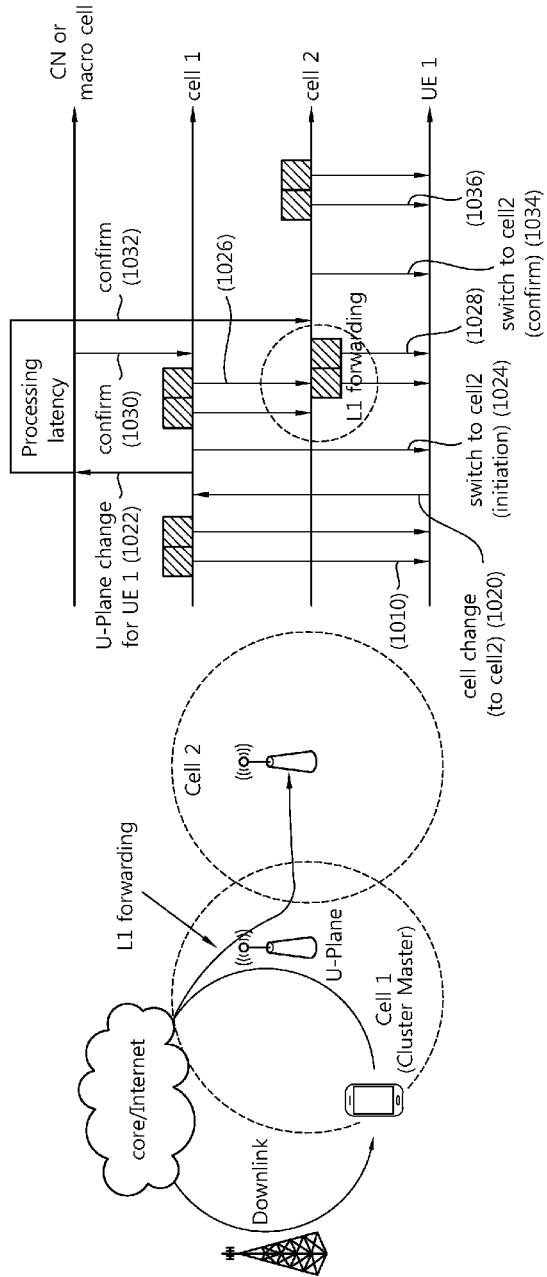
[Fig. 11]

[Fig. 12]
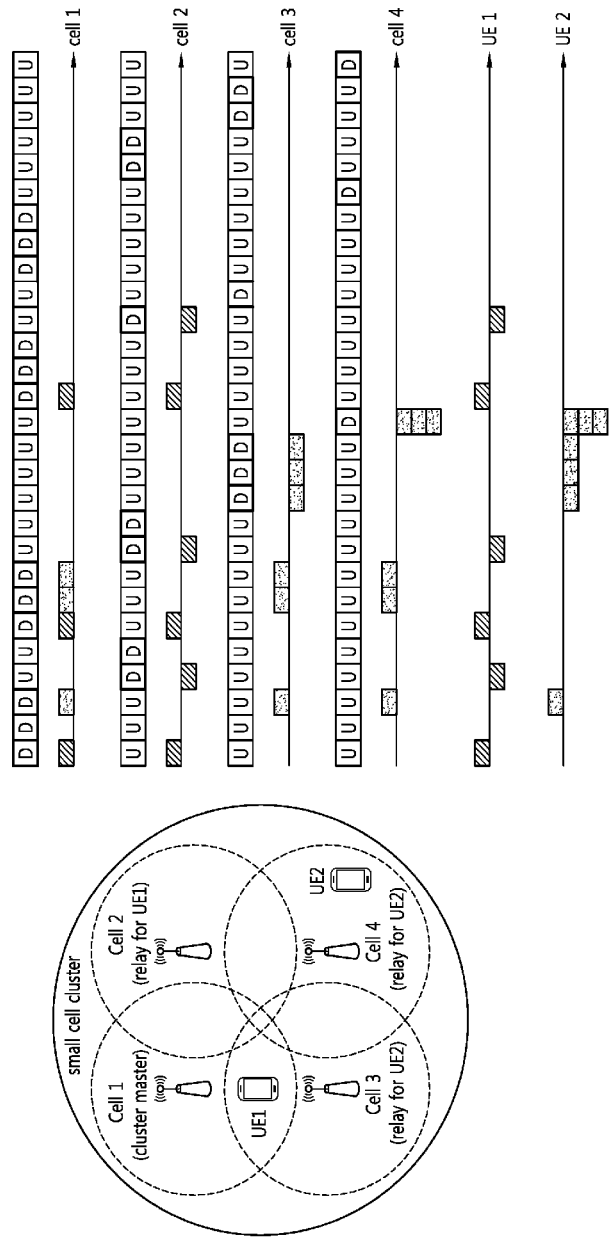

[Fig. 13]
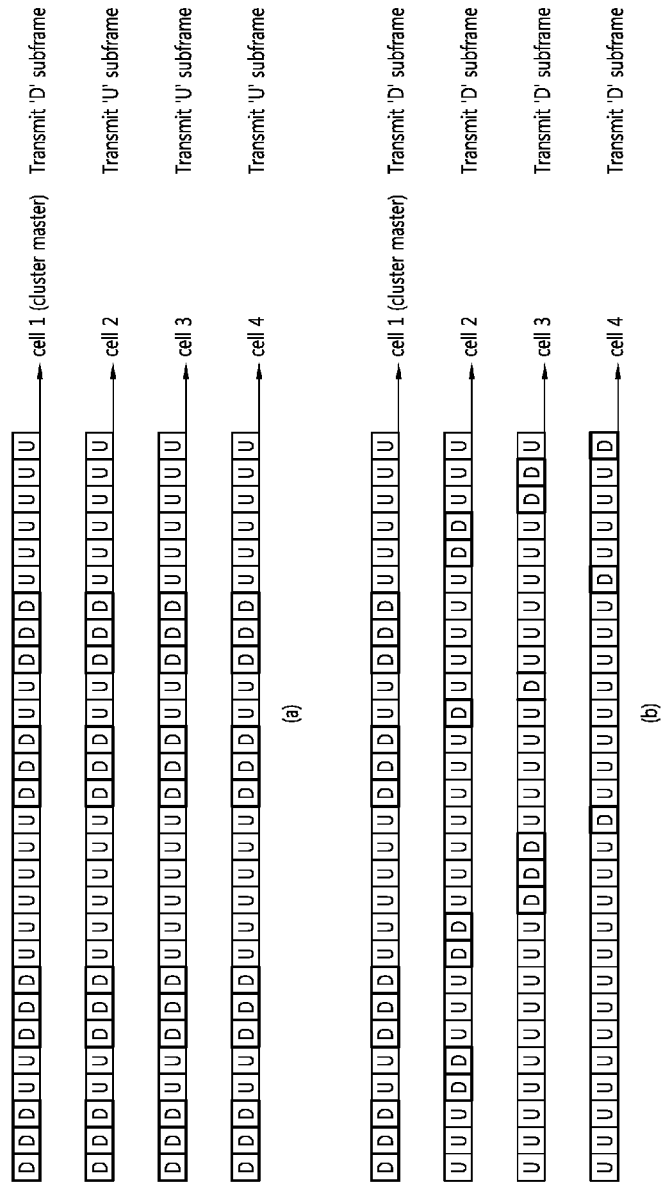
[Fig. 14]
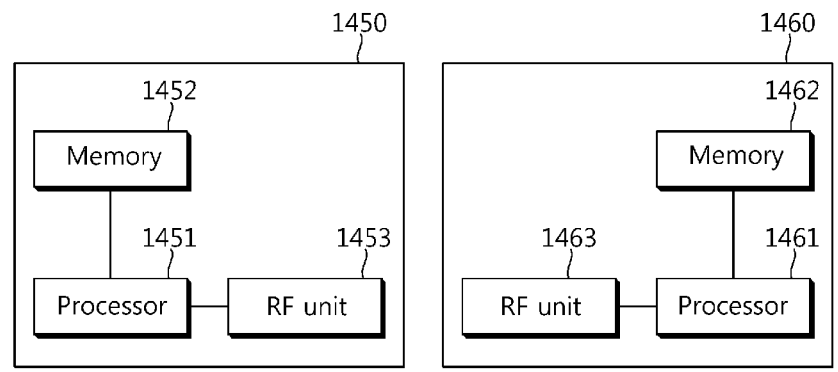

US 9,843,950 B2

METHOD AND APPARATUS FOR PERFORMING DATA TRANSMISSION IN WIRELESS COMMUNICATION SYSTEM

CROSS REFERENCE TO RELATED APPLICATIONS

This application is the National Phase of PCT/KR2014/002184 filed on Mar. 14, 2014, which claims priority under 35 U.S.C. 119(e) to U.S. Provisional Application No. 61/785,785 filed on Mar. 14, 2013, all of which are hereby expressly incorporated by reference into the present application.

TECHNICAL FIELD

The present invention relates to wireless communications, and more particularly, to a method and apparatus for performing data transmission in a wireless communication system consisting of multiple carriers over single frequency or multiple frequencies.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

To increase the capacity for the users's demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and a User equipment as a Terminal. Also an efficient cell planning for multi-CCs is required. Also various signals or efficient cell planning schemes are required to transmit between the eNB and the UE to support inter-cell interference reduction and carrier extensions. Furthermore, inter-node resource allocation by tight coordination among eNBs for a UE is also feasible where multi-CC aggregation is achieved over multiple eNBs/nodes. An efficient operation scheme for the cell planning including a new carrier which is necessarily transmitted restricted or eliminated controls and RS signals, and further UE's operation in a small cell cluster environment need to be defined. The efficient operation includes handling small cell(s) functionality for more efficient data transmission.

DISCLOSURE OF INVENTION

Technical Problem

The present invention provides a method and apparatus for performing data transmission in a wireless communication system.

The present invention also provides a method and apparatus for configuring a small cell with relay functionality for data transmission in a wireless communication system.

The present invention also provides a method and apparatus for performing data transmission between nodes by using a fast backhaul of air interface in a wireless communication system.

Solution to Problem

In an aspect, a method for performing data transmission in a wireless communication system is provided. The method may includes performing a radio resource control (RRC) connection procedure with a macro cell having a first frequency; performing a radio resource management (RRM) measurement on a small cell having a second frequency or a third frequency, and reporting a result of the RRM measurement to the macro cell; and receiving data via the second frequency or the third frequency, the data is consecutive data relayed from an initial transmission of the macro cell, wherein the macro cell and the small cell are connected with a fast backhaul by using air interface.

The method may further include receiving an enhanced Physical Downlink Control Channel (ePDCCH) configuration on a transmission point (TP) including the second frequency or the third frequency from the macro cell; and receiving an indication whether the second frequency or the third frequency of the small cell is configured for a data relay of the macro cell or not.

In another aspect, an user equipment (UE) for performing data transmission in a wireless communication system is provided. The UE includes a radio frequency (RF) unit for transmitting and receiving a radio signal; and a processor operatively coupled to the RF unit, wherein the processor is configured for: performing a radio resource control (RRC) connection procedure with a macro cell having a first frequency; performing a radio resource management (RRM) measurement on a small cell having a second frequency or a third frequency, and reporting a result of the RRM measurement to the macro cell; and receiving data via the second frequency or the third frequency, the data is consecutive data relayed from an initial transmission of the macro cell, wherein the macro cell and the small cell are connected with a fast backhaul by using air interface.

Advantageous Effects of Invention

The proposed embodiment supports data transmission efficiency with dynamic coverage by small cell configuration. Especially, the proposed embodiment supports to configure a small cell for the data transmission based on the UE mobility and/or movement, the small cell and a macro cell can be connected via air interface for the data transmission efficiency without latency.

BRIEF DESCRIPTION OF DRAWINGS

FIG. 1 shows a wireless communication system to which the present invention is applied.

FIG. 2 shows an exemplary concept for a carrier aggregation (CA) technology according to an exemplary embodiment of the present invention.

FIG. 3 shows a structure of a radio frame to which the present invention is applied.

FIG. 4 shows downlink control channels to which the present invention is applied.

FIG. 5 shows a dual connectivity environment as exemplary embodiment of the present invention.

FIG. 6 shows examples of data flow which the present invention is applied.

FIG. 7 shows an example of data transmission with beamforming which the present invention is applied.

FIG. 8 and FIG. 9 show an initial procedure using a small cell configuration which the present invention is applied.

FIG. 10 shows an example of a subframe configuration for data transmission which the present invention is applied.

FIG. 11 shows an example of data forwarding which the present invention is applied.

FIG. 12 shows an example of data forwarding in small cell cluster which the present invention is applied.

FIG. 13 shows an example of ACK/NACK transmission subframes which the present invention is applied.

FIG. 14 shows a block diagram showing a wireless communication system according to an exemplary embodiment of the present invention.

MODE FOR THE INVENTION

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) explains. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and re-assembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

FIG. 2 shows an exemplary concept for a carrier aggregation (CA) technology according to an exemplary embodiment of the present invention.

Referring to FIG. 2, the DL/UL subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a Pcell (primary serving cell) is a resource in which the UE initially establishes a connection (or a RRC connection) among several serving cells. The Pcell serves as a connection (or RRC connection) for signaling with respect to a plurality of cells (CCs), and is a special CC for managing UE context which is connection information related to the UE. Further, when the Pcell (PCC) establishes the connection with the UE and thus is in an RRC connected mode, the PCC always exists in an activation state. A SCell (secondary serving cell) is a resource assigned to the UE other than the Pcell (PCC). The SCell is an extended carrier for additional resource assignment, etc., in addition to the PCC, and can be divided into an activation state and a deactivation state. The SCell is initially in the deactivation state. If the SCell is de-activated, it includes not transmit SRS on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARM). That is, ACK/NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUCCH) that carries user data is allocated in the frequency domain. The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a CQI, and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system.

Herein, an ePDCCH can be one of solutions of limitation for a PDCCH transmission or new control information transmission of near future communication system including a new type of carrier as shown in FIG. 4. The ePDCCH which can be multiplexed with the PDSCH can support multiple Scells of the CA.

Referring to FIG. 4, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in MBSFN subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where CRS may be omitted in some subframes or PBCH may not be transmitted.

For this next LTE system or enhanced communication system, this proposed embodiment provides that the new carrier cell may be introduced in which all or some of the proposed backward compatible legacy signals and/or channels are not transmitted for reasons of the improvement of an interference problem between a plurality of cells, the enhancement of carrier extensibility, and an increase in the degree of freedom in providing advanced features. Even though the proposed invention is mainly described for the new carrier cell as an example, it does not limit to the new carrier cell only. It can be applied to legacy carriers without the loss of generality as well. More details, this invention considers cases where cell-specific RS used for tracking and the Radio Resource Management (RRM) measurement would not be transmitted at all or transmitted only a subset of subframes different from legacy carrier. For a convenience, this invention shows an example where CRS or tracking RS is transmitted every 5 msec e.g., subframe #0 and #5 in each radio frame. More particularly, a new carrier may refer a carrier which performs cell on/off where eNB turns off transmissions upon no active UE attached or based on a pattern. If this is assumed, this invention shows an example where PSS/SSS/CRS or a discovery signal based on CSI-RS is transmitted every T msec with a predetermined value e.g., T=200, or more than 200.

This proposed embodiment also supports an efficient transmission within a small cell cluster. More specifically, a dual connectivity for data flow and macro/small cell carrier-aggregation (CA), inter-site CA, or UE is connected to a small cell which belongs to a small cell cluster assuming a dense small cell deployment are supported.

FIG. 5 shows a dual connectivity environment as exemplary embodiment of the present invention.

Referring to FIG. 5, a dual connectivity supports a few small cell scenarios. The (a) shows that C/U split case as a first approach of the dual connectivity is to divide C-Plane and U-Plane between a macro cell and a small cell layer, the C-Plane is serviced via the macro cell and the U-Plane is serviced via the small cell, the small cell is used for data extension. The (b) shows that D/U split case as a second approach of the dual connectivity is to divide Down-Link and Up-Link between a macro cell and a small cell layer, the DL is serviced via the macro cell and UL is serviced via the small cell. Lastly, the (c) shows that a connection case of Relay/Initial TX split is to divide a relayed connection and a regular connection between a macro cell and a small cell layer as a third approach, the C-Plane and/or U-Plane is serviced via the macro cell, and the C-Plane and/or U-Plane is serviced via the small cell as the relayed connection, the U-Plane is further serviced via the small cell.

More particularly, in scenario of (c), a UE has two connections; one via the small cell is connected to the macro cell as a relay function, and the other to the small cell where data can be transmitted in either or both connections.

FIG. 6 shows examples of data transmission flow which the present invention is applied.

Referring to FIG. 6, a macro cell performs an initial transmission to a UE via f1 of the macro cell. As described, the macro cell/small cell support carrier-aggregation (CA), here a small cell has two serving cells via f1 and f2 for the UE.

For example, the small cell can overhear the macro cell s data transmission to the UE, the small cell f1 is allowed to function as a relay node for the macro cell f1 so that the small cell uses a serving cell f1 to encourage data efficiency. The small cell further uses a serving cell f2 to extend cell coverage with applying a normal configuration of Scell. The small cell can configure the CA including the macro cell f1 and the small cell f1 and f2.

Thus, the UE can assure the data efficiency to receive the initial PDSCH data from the macro cell f1 (610, 616) and overhear the PDSCH data from the small cell f1 (611, 617), and also receive next time PDSCH data transmission from the small cell f1 as a relay of the macro cell f1 (612). The UE can receive the data consecutively from the small cell using the serving cell of f1 and the serving cell of f2 (614). Herein, the small cell is more closely located for the UE than the macro cell f1 so that small cell f1 is encouraged the UE for the data transmission efficiency, the f1 in the small cell and the f1 in the macro cell are in co-channel.

If the small cell and the macro cell are in different channel, the macro cell f1 can starts an initial transmission to a UE through a target of a small cell (620), herein the small cell has a serving cell f2, and the small cell f2 is allowed to function as a relay to encourage data efficiency of the macro cell f1. Thus, the UE can assure the data efficiency to receive the consecutively PDSCH data from the small cell f2 as a relay of the macro cell f1 (622, 624). The macro cell f1 transmits PDSCH data to the UE by using the small cell f2 as a relay (626, 628). In this time, the UE performs a frequency switch to receive the data between f1 and f2 of macro cell and small cell.

When the small cell supports f1 and f2 further, the serving cell f1 overhears PDSCH data from the macro cell f1 to the serving cell f2 (630, 632). The serving cell f2 sends to NACK about the PDSCH data to the serving cell f1 to reduce overhead of the macro cell f1 (633), and then the UE can receive the PDSCH data retransmitted from the serving cell f1 of the small cell (634). Also the UE receives the PDSCH data from the small cell f2 (636) and sends NACK response about the PDSCH (637), and then receive consecutive the PDSCH data from the small cell f2 (638).

The above embodiments, the small cell including at least serving cell with same or different frequency(s) can behave as if a relay of a master cell or a macro cell to ensure data transmission efficiency. This proposed embodiment discusses an efficient backhaul mechanism to support with non-ideal backhaul using air interface even with/without the dual connectivity. The benefits of having a relay function of the small cell are followings. Throughput gain by multihop transmission is supported. Instead of direct communication, a relayed via a relay communication is expected to enhance the throughput of system. It also supports overhead reduction of UE's feedback. The UE does not require performing measurement and feedback to the macro cell. Even though feedback for a small cell is still required, it is expected that feedback for a small cell is much less than for a macro cell. This allows narrow beam control to a small cell which is static, and thus channel condition may not change dynamically and CSI feedback is relatively accurate, from a macro cell to maximize the throughput and spectral efficiency. From a small cell to a UE, either narrow beam or wide beam can be used dependent on UE mobility and/or data amount and/or feedback amount. Based on Reference signal received power (RSRP)/Reference Signal Received Quality (RSRQ) mechanism, it is likely that a UE is associated with the macro cell and the small cell even without signal-to-interference-plus-noise ratio (SINR), to allow better spectral efficiency, it would be good if UE is associated with the small cell via a relay function. Fine control between the macro cell and the small cell supports. As a small cell may be static, or mobility is controlled, the fine control between the macro and the small cells is feasible for such as narrow beam, hand-over, etc. To have an agency for each UE to handle mobility and feedback would reduce the overhead from the UE perspective with increasing network throughput.

FIG. 7 shows an example of data transmission with beamforming which the present invention is applied.

Referring to FIG. 7, the macro cell (700) composes a narrow beamforming to the small cell 1 (701) to enhance PDSCH transmission for the UE, the small cell 1 forwards the PDSCH received from the macro cell to the UE with keeping more stable channel condition. The data transmission with the air interface between the macro cell and a small cell leads to a fast backhaul for data efficiency. When the UE can move to the small cell 2 from the small cell 1, the UE can transmit uplink transmission via the small cell 2 (702). The UE can support the small cell 1 and 2 as serving cells to encourage data transmission efficiency.

As described, if the UE is capable of supporting a dual connectivity, the UE may be connected to a macro cell and small cell at the same time. Additionally, a small cell for relaying can be configured to a UE using one or more approaches as followings. For UE transparent relay, if a small cell relays data without explicit configuration, two approaches are feasible. One is to support type-2 relay node by the small cell so that a UE does not have to differentiate the macro and small cell as a relaying node. Alternatively, a small cell only performs retransmission for the UE. Otherwise, when explicit relay node configuration can be applied, it supports to inform the UE about a relay cell so that the UE may utilize the information on the relaying serving cell of small cell. In this case, a UE is connected to the macro cell, yet, data will be transmitted by the relay cell. If a relaying small cell and a macro cell are in the same frequency, the macro cell and the small cell can transmit the data simultaneously with same frequency as a different transmission point in CoMP technique can be used as well. Or, the retransmission from a relaying small cell not based on HARQ process can be feasible. From a UE perspective, even though UE may be able to overhear the data from the macro cell, HARQ process and timing will be dependent on the data reception from the relay.

About the configuration of Scell for a relay function, a RRC configuration of the relaying small cell can be configured for the UE, the relay node can be configured by higher layer signaling similar to a Scell configuration, or the UE for the relay node can be configured by MAC signaling similar to configuration/activation of SCell. Furthermore, a dynamic signaling can be applied. Multiple candidate relays can be configured in prior and the relay can be selected either semi-statically via higher layer signaling or MAC CE or dynamic signaling e.g., Downlink Control Information (DCI).

Depending on UE mobility or RRM measurement or CSI measurement, a UE may request an indication of a proxy or forwarder explicitly, or the serving cell may configure a proxy small cell to boost throughput. If the serving cell is configured, the UE may transmit CSI feedbacks on both the serving cell as master cell (e.g. macro cell) and the relay small cell so that the serving cell as the macro cell may control to enable or disable the relay configuration of small cell.

FIG. 8 and FIG. 9 show an initial procedure using small cell configuration which the present invention is applied.

Referring to FIG. 8, a UE is connected to a macro cell and then is configured with one or more small cell for a relay. Firstly, the UE is determined PSS (Primary Synchronization Signal)/SSS (Secondary Synchronization Signal) transmitted from the macro cell and the small cell (811, 812). The synchronization channels such as PSS/SSS can be transmitted to identify cell ID which will be used for transmitting cell-specific RS, so the UE can detect the macro cell and small cell each with PSS/SSS each. Wherein the cell ID each may be equal to physical cell ID of the cell or given by a higher layer signaling. The small cell ID is determined by the discovery signal or a synchronization signal such as the PSS/SSS, the synchronization signal of the small cell may also have equal to or less PRB than legacy PSS/SSS's.

After detecting the synchronization channels including the PSS/SSS or the discovery signal, the UE performs a RACH procedure that so the UE acquires PRACH configuration by reading MIB/SIBs from the macro cell C1, the PRACH configuration and resource used for RACH is either pre-determined or carried in the system information of the MIB/SIBs. And then the UE receives RACH response from the macro cell (821, 822). After the RACH procedure is completed, the UE is in RRC connected (823).

The UE performs RRM on PSS/SSS/CRS of the small cell C2 and reports the RRM results to the macro cell (831). The macro cell may configure the small cell C2 as a relay for data transmission so that the UE can configure the small cell further to encourages the data efficiency (841). That is, once the UE is attached to the macro-cell and further one or more serving cells with small cells, depending on UE RRM report, the small cell may configure a relay node which will perform data relaying from the serving cell to the UE.

The macro cell may configure a new ePDCCH set which may be configured when the physical transmission point changes (842). The ePDCCH configuration of the small cell C2 can be transmitted to UE if needs, the small cell can transmit the ePDCCH configuration to UE directly (843).

When external backhaul interface is available between the macro cell and the small cell of the relay, the external backhaul can be used for transferring data, the air interface can be the backhaul without latency. This embodiment focuses on the case where the separate backhaul interface at least for data exchange is not available or not ideal between the serving cell as the macro cell and the small cell as the relay node. Thus, the relay node may use the air interface to receive/transmit data from/to the serving cell which is shared with the relay small cell and the UE communication. The relay node shall be able to receive data from the serving cell and also to transmit data to the serving cell. From the capability perspective, this can be seen as if the small cell behaves as if UE from the serving cell point of view to perform relay and eNB from the UE served by the cell as a serving cell.

The macro cell transmits the ePDCCH/PDSCH to the small cell (845), and the small cell forwards the PDSCH data to UE (846). The UE checks the received PDSCH and request a signal of a NACKed PDSCH to the small cell C2 based on HARQ process (847). The small cell retransmits the requested PDSCH to the UE (848), the UE responds a signal of an ACK after checking the retransmitted PDSCH (849). The small cell 2 can send an ACK message to the macro cell C1 to be sure data transmission (850).

The ePDCCH/PDSCH with NDI (new data indicator) may also transmit from the macro cell to the small cell (861), the small cell can relay the received PDSCH data to the UE (862) and the UE transmit a signal of an ACK after checking the relayed PDSCH (864). The ACK from the small cell C2 to the macro cell C1 may be transmitted after receiving the ACK from the UE (863).

Herein, Cell ID between the serving cell of the macro cell and a relay cell of the small cell may be different. When the serving cell configures a relay node, it will also send information related to the relay node (e.g., cell ID, scheduling information, etc) to the UE so that the UE can properly receive the data from the relay node.

In the proposed embodiment, the benefit of allowing the small cell as a relay and data transmission from the small cell addition to the macro serving cell with a dual connectivity compared to single connectivity to the small cell is to handle the dual connectivity for mobility handling and maintaining C-Plane in the macro-cell layer. Furthermore, if a UE does not support carrier aggregation capability, this approach may support dual connectivity as well where all the necessary information exchange between the macro cell and the UE can be done via the relay small cell as well as data offloading via the small cell.

When the relay of the small cell and the macro cell use different frequencies and UE is not capable of performing carrier aggregation, the overall procedure is shown in FIG. 9. The FIG. 9 shows an initial access procedure to configure a small cell configuration with different frequency which the present invention is applied.

Referring to FIG. 9, the UE can detect the macro cell by receiving PSS/SSS of the macro cell C1 having f1 (911). The UE performs a RACH procedure by transmitting PRACH preamble of the PRACH configuration and receiving RACH response from the macro cell (921, 922), and transfers to RRC connected mode (923).

When the UE is configured to read PDCCH or discovery signal of small cell, the UE can perform measurement (924). For example, a UE may perform measurement on discovery signal transmission subframes and DRX on durations and subframes activated by SCell activation or macro cell association. The subframes or the discovery signal transmission subframes can be a measurement gap. The UE performs RRM on PSS/SSS/CRS of the small cell C2 (925) and reports the RRM results of inter-frequency to the macro cell, the macro cell f1 and the small cell f2 are different frequencies so the UE perform inter-frequency measurements (926).

The macro cell may configure the small cell C2 as a relay for data transmission so that the UE can configure the small cell further to encourages the data efficiency (931). The macro cell may configure an ePDCCH configuration which may be configured because the physical transmission point is changed for the UE (932).

The UE performs a RACH procedure by transmitting PRACH preamble of the PRACH configuration and receiving RACH response from the macro cell (941, 942), and perform cell selection as frequency switch to the small cell C2 by transmitting a confirm message to the macro cell (943). The ePDCCH configuration of the relay node may be transmitted to UE if needs, so that the small cell can transmit the ePDCCH configuration to the UE (944).

And then the macro cell transmits the ePDCCH/PDSCH to the small cell (950) and receives a response of ACK about the ePDCCH/PDSCH (951). The small cell forwards the PDSCH data to UE (952). When the UE requests to retransmit the PDSCH data after checking the relayed data of small cell, the UE sends a signal of a NACK signal to the small cell C2 based on HARQ process (953). And then the small cell retransmits the requested PDSCH to the UE (954), the UE responds a signal of an ACK after checking the retransmitted PDSCH (955).

The small cell forwards CSI/RRM measurement result of the macro cell (961), it indicates interference measurement for CSI calculation of UE, the UE may be triggered when CSI request bit field is 2 bits and is triggering aperiodic CSI report for the small cell.

The UE falls back to f1 frequency of the macro cell, the RACH procedure is completed by receiving RAR of the macro cell (971, 972). Thus, the UE may configure a small cell as a relay in different frequency without CA.

With non-ideal backhaul between the serving cell and the small cell of a relay, one approach to exchange data between cells is to use air-interface as if the small cell is a UE connected to the serving cell as a relay node connected to the macro cell. As the small cell as the relay node can be the serving cell for other UEs, to support those UEs, firstly, the relay node transmits the set of subframes which can be used for relay purpose including backhaul communication e.g., receiving data from the donor cell and transmitting data to the donor cell. Individual subframe sets for downlink and uplink can be sent or subframes with up/down direction may be transmitted. Upon receiving the information, the scheduling to the relay is limited to those backhaul-capable subframes. Similar to ABS (Almost blank subframe), this information may not be known to the UEs including either UEs served by the small cell or UEs relayed by the small cell. The example of backhaul communication via air interface is shown in FIG. 10. FIG. 10 shows an example of a subframe configuration for data transmission which the present invention is applied.

As shown in FIG. 10, if the small cell as a relay node transmits ACK upon receiving the initial transmission, the A/N timing would be n+k, where k>=2. In other words, the first uplink after 2 msec would be the A/N subframe for the downlink transmission. Here, the simplest approach to determine A/N timing for PDSCH, A/N for PDSCH received at n-th subframe is transmitted at the first available uplink subframe n+2-th subframe where k>=2. It may not evenly distribute the number of A/N bits that each uplink may have to transmit, yet, it may be the simplest approach to determine A/N timing for various subset of usable uplink subframes. When it calculates the number of A/N bits, it may utilize DAI. The actual valid downlink subframes (i.e., excluding non-available TDD downlink subframes) will be used for calculating the number of A/N bits. Another approach is to send A/N only when A/N request is received or, send A/N based on A/N SPS configuration.

For uplink resource for relay node A/N and feedback, a separate uplink resource may be configured for each small cell as a relay node for PUCCH transmission. Or, a virtual cell ID can be given to the uplink transmission by each relay node so that it can be multiplexed with other uplink transmissions from other UEs or relay nodes.

Control signaling between the donor node of the macro cell and the relay node of small cell can be configured by using R-PDCCH, or ePDCCH. The ePDCCH case is used when relay and donor node share the same frequency, to allow overhear by the UE on the donor node communication, the ePDCCH configuration for the relay node can be informed to the UE as well. RNTI used for DCI can be either C-RNTI of the UE or RNTI for the relay node. If PDCCH is used, C-RNTI of the UE may be used for RNTI. A Relay node is expected to perform blind decoding on C-RNTIs of UEs which are supported by the relay node for relaying function served by the donor node. Which control channel is used for backhaul communication for data exchange may be indicated by the macro cell of the donor node upon configuring a relay function.

As described, the small cell for the relay function shall reports CSI feedback if configured to the donor node as to other normal UE. When a UE is configured with the small cell for relay functions, it may not transmit CSI feedback to the serving cell. The CSI feedback to the relay node may be transmitted to the small cell.

FIG. 11 shows an example of data forwarding among small cells which the present invention is applied.

Referring to FIG. 11, cell2 shall be connected to cell1 as a relay for UE1 when UE1 switches the serving cell, either both C/U plane or for U-Plane only to cell2. When it is assumed non-idea backhaul between cell1 and macro cell/or CN, cell switching of a serving cell or U-Plane cell from cell1 to cell2 would require some latency. To allow smooth transition without service interruption, when a UE requests a cell change from cell1 to cell2, cell1 and cell2 can collaborate transmitting the data which can be done transparently to the UE or explicitly. This expanding the concept of relaying or L1 forwarding among small cells, data forwarding can be possible. This could be useful when backhaul among small cells are non-ideal where data cannot be freely exchanged among small cells due to limited capacity and/or latency.

One use case is when a cluster master is connected to a macro cell which is handling UE mobility aspect. When a UE moves within a cluster, a cluster master may behave as if home node in mobile IP concept. Until it is notified to the core or macro eNB that UE moves to different cell e.g., cell 2 so that proper data path is changed to cell2, cell1 can forward the data to cell2 for data forwarding.

When data reception, the UE1 requests to switch the serving cell2 from cell1 (1010), the cell1 performs to switch from the cell1 to cell2 by informing U-Plane change for the UE1 to macro cell (1012) and switch to cell2 as initiation (1014). The cell1 forwards the data to cell 2 by using air interface (1016), the cell2 transmits the forwarding data to the UE1 by using air interface (1018). The CN or the macro cell sends a confirm message to cell 1 and cell 2 (1021, 1022). The cell 2 also sends a confirm message of cell switching to the UE1. The cell 2 transmits the data as a serving cell.

When a UE requests to change the cell, it will notify the current serving cell and the serving cell would reply with confirmation to the UE similar to regular hand-over procedure except that confirmation will be delivered to the UE within k msec timeframe (e.g., k=8) to minimize reconfiguration latency and overhead. Once the serving cell receives switch request from the UE, it will start data forwarding to the new serving cell which will forward data to the UE where the UE would receive only one transmission from the new serving cell. It can be called as transparent switch.

Different from the above transparent switch, a UE is indicated with final confirmation message for cell switch; it may be similar to hand-over procedure. In transient period, the UE can receive data from both previous and new serving cells as the described initial transmission and relayed transmission. A UE can combine the same PDSCH from two serving cells.

FIG. 12 shows an example of data forwarding in small cell cluster which the present invention is applied.

Referring to FIG. 12, cells within a small cell cluster may cooperate among themselves to forward data within the cluster. When downlink and uplink usage among small cells are coordinated beforehand, cells can coordinate such that one or a few cells would be relay nodes for a specific UE served by the cluster.

For example, a UE1 is attached to the cluster as shown in FIG. 12 and cell1 is the cluster mater cell which is receiving the data from the core or from the macro cell. If backhaul among small cells are limited, L1 backhaul can be used among small cells to exchange the data and perform L1 forwarding. The transmission and reception among small cells are coordinated as shown cell1 performs DDD-UUDDDUUUUUUDDDUUDDDUUUUUU where D indicates that the cell can transmit in that subframe and U indicates that the cell shall listen to other cells in that subframe. The cells can be heard by each other within the cluster. In this case, to allow flexible UE movement within a cluster, each cell may perform L1 forwarding upon receiving a data from cluster master.

For example, cell1 can transmit data for UE1 and UE2 which can be heard by all cells including both UEs. Cells which are responsible for relaying data for UE1 will store the data and forward upon D subframe as shown. When multiple data needs to be relayed, it can be either combined into one PDSCH or multiple PDSCH may be transmitted. To differentiate or identify which data is relayed and allow smart combining at UE side at L1, DCI may carry the information about relayed data.

A source cell ID in the DCI for relayed data may be added. When a UE knows the cell ID within a cluster as a CID, one approach is to add source CID in DCI, e.g., 3 bits source CID to differentiate 8 cells. By decoding the DCI with source CID, a UE can identify what data has been relayed. By comparing the data received lastly from the source CID, UE may be able to determine whether the data is relayed or repeated data, or forwarded new data. If the data is repeated by the relay i.e., UE has received data from both source node and relay node, it may combine data. Otherwise, it treats the data separately. A source HARQ number in the DCI for relayed data may be added. When a UE knows the source node e.g., cluster master, another approach is to add HARQ number used in original data transmission. By comparing HARQ number between data transmitted by the source node and data transmitted by the relay node, the UE may determine whether the data is repeated or new. When a separate ePDCCH set may be configured for initial transmission and relayed transmission so that a UE can identify relayed data from initial transmission by performing blind decoding. Once it has received relayed data, it may compare the data with data transmitted by the source node, e.g., cluster master to identify whether the data is repeated or new. Also sequence number can be added, another approach is to add sequence number for each new PDSCH so that each PDSCH can be differentiated by sequence number. If this is used, a NDI field can be eliminated. This approach can be used with ideal backhaul case as well where each relaying small cell transmits redundant data to an UE for better reliability.

When a UE is not required to be associated with any cell within a cluster especially for U-Plane data transmission, if cluster master is receiving data from core network or backbone network, the UE shall know the source node and the relay nodes for itself. For example, UE1 is indicated with cell1 as source node and cell2 as relay node and UE2 is indicated with cell1 as source node and cell3/4 as relay nodes.

A relay node may not transmit redundant data if NDI is toggled for the same HARQ process number which indicates that data has been received successfully by the UE. For example, when a relay node has received a PDSCH for UE1 at n-th subframe which will be transmitted at n+m-th subframe (e.g., m=20) due to backhaul scheduling, if it has received another PDSCH to the UE with NDI toggled with the same HARQ process number, it shall disregard previous PDSCH.

When ePDCCH set is used to differentiate source node and relay node, a separate set may be configured per each cell or one set is configured for source node if it is reachable and the other set is configured and shared for all relay nodes. A separate ePDCCH monitoring subframe configurations can be done. In this case, unless signaled otherwise, a UE may assume that first ePDCCH set is for the initial transmission and second ePDCCH set is for the relayed transmission.

When a UE has received more than one PDSCH which includes one is from source node and others are from relaying nodes, the ACK/NACK transmission can be performed with various ways. Firstly, the UE can transmit ACK/NACK on uplink CC to be configured. Regardless of downlink cell, UE transmits A/N always to the configured uplink. If it is configured with uplink paired with source node downlink, the source node will receive the ACK/NACK. The UE can also transmit ACK/NACK to all nodes including source and relay nodes. Further the UE can transmit ACK/NACK to the node where the last PDSCH has been transmitted from. For example, if a UE has received initial data and a redundant data from a small cell as a relay node, the ACK/NACK will be transmitted to the relay node.

If the ACK/NACK is transmitted in configured uplink CC or to a node which the last PDSCH transmitted, the retransmission would be occurred by the node which has received NACK from the UE. If a relay node of a small cell has received an ACK from an UE, it shall forward it to the source node so that new data can be scheduled. The ACK/NACK resource by a relay node shall be determined based on CCE index used for initial transmission. In other words, the ACK/NACK resource is determined by a relay node as if it is a UE served by the source node.

FIG. 13 shows an example of L1 backhaul downlink subframes which the present invention is applied.

Referring to FIG. 13, for more details, the L1 backhaul downlink subframe for each small cell is composed as followings. In terms of data/control exchange among small cells within a cluster via air interface, two approaches are feasible. A star topology type includes where other small cells listen data transmission from the master small cell when it is transmitting. In other subframes, multiple small cells may transmit uplink to the master small cell. In this case, one TDD configuration determined by the cluster master will be propagated to the small cells. Referring to FIG. 13 (a), one embodiment is shown where cluster master transmit in 'D' subframe where other cells can transmit in 'U' subframe. That mesh topology type is different from the star topology includes where non-master cell can listen transmission from the master cell. Using mesh topology, each small cell can hear other small cells and thus may be able to perform discovery processes as well. Referring to FIG. 13 (b), one embodiment is shown where each cell transmits in 'D' subframe with coordinated 'D' subframe partitioning among cells. In terms of selecting downlink subframes where each cell can transmit, cluster master first defines the baseline subframe configurations and each small cell based on ID given within a small cell cluster e.g., lower ID starts selecting downlink subframes first selects the downlink subframes. Simpler approach is to determine downlink subframes based on its cell ID or ID given within a cluster such as using a hash function based on the ID.

FIG. 14 is a block diagram showing a wireless communication system according to an embodiment of the present invention.

ABS 1450 includes a processor 1451, a memory 1452, and a radio frequency (RF) unit 1453. The memory 1452 is coupled to the processor 1451, and stores a variety of information for driving the processor 1451. The RF unit 1453 is coupled to the processor 1451, and transmits and/or receives a radio signal. The processor 1451 implements the proposed functions, procedures, and/or methods. In the embodiments of FIG. 2 to FIG. 13, the operation of the BS can be implemented by the processor 1451.

Especially, the processor 1451 may configure one or more cells with different frequencies, for this invention the processor 1451 configures the cells to support Semi-Persistent Scheduling, TTI-bundling, HARQ-ACK procedures. The processor 1451 may configure and transmit a configuration including a small cell as a relay node, the information related to the relay node (e.g., cell ID, scheduling information, etc) to the UE so that the UE can properly receive the data from the relay node. It also includes ACK/NACK subframe configuration for the data transmission.

Also the processor 1451 may configure an ePDCCH configuration, CSI/RRM measurement for the small cell because the physical transmission point for data transmission is changed for the UE, and configure and transmit discovery signals or PSS/SSS scrambled with the small cell ID. And then processor 1451 may perform a RACH procedure and data transmission via the selected cell by using a corresponding cell ID. And the processor 1451 may also configure CRS patterns by the small cell ID or PSS/SSS each, the CRS patterns includes a start subframe, subframe set, and RB of the CRS in a radio frame.

In other words, the processor 1451 may configure and transmit the configuration using a serving cell (Scell) configuration, a hand-over configuration, a dual connectivity configuration, a relay node configuration, or a radio resource control (RRC) configuration via a primary cell (Pcell or master cell) of macro cell. Further the processor 1451 may configure proper TDD configuration for the macro cell and small cell as a relay node each.

The wireless device 1460 includes a processor 1461, a memory 1462, and an RF unit 1463. The memory 1462 is coupled to the processor 1461, and stores a variety of information for driving the processor 1461. The RF unit 1463 is coupled to the processor 1461, and transmits and/or receives a radio signal. The processor 1461 implements the proposed functions, procedures, and/or methods. In the embodiments of the FIG. 2 to FIG. 13, the operation of the UE can be implemented by the processor 1461.

Especially, the processor 146 may configure one or more cells with different frequencies, for this invention the processor 146 configures the cells to support Semi-Persistent Scheduling, TTI-bundling, HARQ-ACK procedures. The processor 1461 may configure and receive a configuration of serving cells including a macro cell and a small cell as a relay node, the information related to the relay node (e.g., cell ID, scheduling information, etc) supports that the UE can properly receive the data from the relay node of the small cell and the macro cell. It also includes ACK/NACK subframe configuration for the data transmission. The processor 1461 may also calculate ACK/NACK timing after receiving the data based on the ACK/NACK subframe configuration.

Also the processor 1461 may configure an ePDCCH configuration, CSI/RRM measurement for the small cell because the physical transmission point for data transmission is changed for the UE, and configure and receive discovery signals or PSS/SSS scrambled with the small cell ID. And then processor 1461 may perform a RACH procedure and data transmission via the selected cell by using a corresponding cell ID. And the processor 1461 may also configure CRS patterns by the small cell ID or PSS/SSS each, the CRS patterns includes a start subframe, subframe set, and RB of the CRS in a radio frame.

In other words, the processor 1461 may configure and transmit the configuration using a serving cell (Scell) configuration, a hand-over configuration, a dual connectivity configuration, a relay node configuration, or a radio resource control (RRC) configuration via a primary cell (Pcell or master cell) of macro cell. Further the processor 1461 may configure proper TDD configuration for the macro cell and small cell as a relay node each.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method for performing data transmission in a wireless communication system, performed by wireless device, the method comprising:
    performing a radio resource control (RRC) connection procedure with a macro cell having a first frequency;
    performing a radio resource management (RRM) measurement on a small cell having a second frequency or a third frequency, and reporting a result of the RRM measurement to the macro cell;
    receiving data via the second frequency or the third frequency, the data being consecutive data relayed from an initial transmission of the macro cell; and
    receiving a downlink control information (DCI) including information about a data relay,
    wherein the DCI includes a source cluster identification (CID), a source hybrid automatic repeat request (HARQ) number, and a sequence number for the data transmission, and
    wherein the macro cell and the small cell are connected with a backhaul by using an air interface.

2. The method of claim 1, further comprising:
    receiving an enhanced physical downlink control channel (ePDCCH) configuration on a transmission point (TP) including the second frequency or the third frequency from the macro cell; and
    receiving an indication of whether the second frequency or the third frequency of the small cell is configured for the data relay of the macro cell or not.

3. The method of claim 1, further comprising:
    checking data transmitted from the first frequency of the macro cell;
    transmitting a signal of acknowledgement (ACK)/not-acknowledgement (NACK) about the data to the small cell; and
    receiving retransmission data transmitted from the second frequency or the third frequency of the small cell.

4. The method of claim 2, wherein the indication is received by:
    a serving cell (Scell) configuration, a hand-over configuration, a dual connectivity configuration, or a radio resource control (RRC) configuration as an RRC signal,
    activation/deactivation of the SCell as a medium access control (MAC) signal, or
    the DCI including information about the data relay.

5. The method of claim 4, wherein the indication includes information on a cell identification (ID) and scheduling information of the second frequency or the third frequency of the small cell to forward the data to the wireless device from the macro cell.

6. The method of claim 1, further comprising:
    receiving, by the small cell, data from the macro cell at an nth subframe for a downlink transmission; and
    transmitting, by the small cell, a signal of acknowledgement (ACK)/not-acknowledgement (NACK) about the data to the macro cell at a first available uplink subframe from an n+2th subframe.

7. The method of claim 1, further comprising:
    requesting a first small cell to perform a cell change to a master cell among small cells;
    performing a cell switch from the first small cell to second small cell;
    receiving data from the second small cell, and
    transmitting a signal of acknowledgement (ACK)/not-acknowledgement (NACK) about the data to a predetermined small cell,
    wherein the first small cell and the second small cell which are configured for the data relay of the macro cell are connected with a backhaul by using air interface, and
    wherein the predetermined small cell for the ACK/NACK is one of a serving cell which is configured for an uplink transmission, a serving cell where the data has been transmitted lastly from, and all serving cells including a source serving cell or a relaying cell.

8. The method of claim 1, further comprising:
    determining whether a received data is relayed or new data by identifying data received lastly from the source CID based on the DCI,
    wherein the determining includes determining an enhanced physical downlink control channel (ePDCCH) set for the source serving cell or the relaying cell.

9. A wireless device for performing data transmission in a wireless communication system, the wireless device comprises:
    a radio frequency (RF) unit to transmit and receive a radio signal; and
    a processor operatively coupled to the RF unit, wherein the processor is configured to:
        perform a radio resource control (RRC) connection procedure with a macro cell having a first frequency,
        perform a radio resource management (RRM) measurement on a small cell having a second frequency or a third frequency, and report a result of the RRM measurement to the macro cell,
        receive data via the second frequency or the third frequency, the data being consecutive data relayed from an initial transmission of the macro cell, and
        receive a downlink control information (DCI) including information about a data relay,
    wherein the DCI includes a source cluster identification (CID), a source hybrid automatic repeat request (HARQ) number, a sequence number for the data transmission, and
    wherein the macro cell and the small cell are connected with a backhaul by using an air interface.

10. The wireless device of claim 9, wherein the processor is further configured to:
    receive an enhanced physical downlink control channel (ePDCCH) configuration on a transmission point (TP) including the second frequency or the third frequency from the macro cell, and
    receive an indication of whether the second frequency or the third frequency of the small cell is configured for the data relay of the macro cell or not, wherein the indication is received by:
a serving cell (Scell) configuration, a hand-over configuration, a dual connectivity configuration, or a radio resource control (RRC) configuration as an RRC signal,
activation/deactivation of the SCell as a medium access control (MAC) signal, or
a Downlink Control Information (DCI) including information about the data relay, and
wherein the indication includes information on a cell identification (ID) and scheduling information of the second frequency or the third frequency of the small cell to forward the data to the wireless device from the macro cell.

11. The wireless device of claim 9, wherein the processor is further configured to:
check data transmitted from the first frequency of the macro cell,
transmit a signal of acknowledgement (ACK)/not-acknowledgement (NACK) about the data to the small cell, and
receive retransmission data transmitted from the second frequency or the third frequency of the small cell.

12. The wireless device of claim 9, wherein the processor is further configured to:
receive, by the small cell, data from the macro cell at an th subframe for a downlink transmission, and
transmit, by the small cell, a signal of acknowledgement (ACK)/not-acknowledgement (NACK) about the data to the macro cell at a first available uplink subframe from an n+2th subframe.

13. The wireless device of claim 9, wherein the processor is further configured to:
request a first small cell to perform a cell change to a master cell among small cells,
perform a cell switch from the first small cell to second small cell,
receive data from the second small cell, and
transmit a signal of acknowledgement (ACK)/not-acknowledgement (NACK) about the data to a predetermined small cell,
wherein the first small cell and the second small cell which are configured for the data relay of the macro cell are connected with a backhaul by using air interface, and
wherein the predetermined small cell for the ACK/NACK is one of a serving cell which is configured for an uplink transmission, a serving cell where the data has been transmitted lastly from, and all serving cells including a source serving cell or a relaying cell.

14. The wireless device of claim 9, wherein the processor is further configured to determine whether a received data is relayed or new data by identifying data received lastly from the source CID based on the DCI, and
wherein, to determine whether the received data is relayed or the new data, the processor is further configured to determine an enhanced physical downlink control channel (ePDCCH) set for the source serving cell or the relaying cell.

* * * * *